United States Patent Office 3,405,892
Patented Oct. 15, 1968

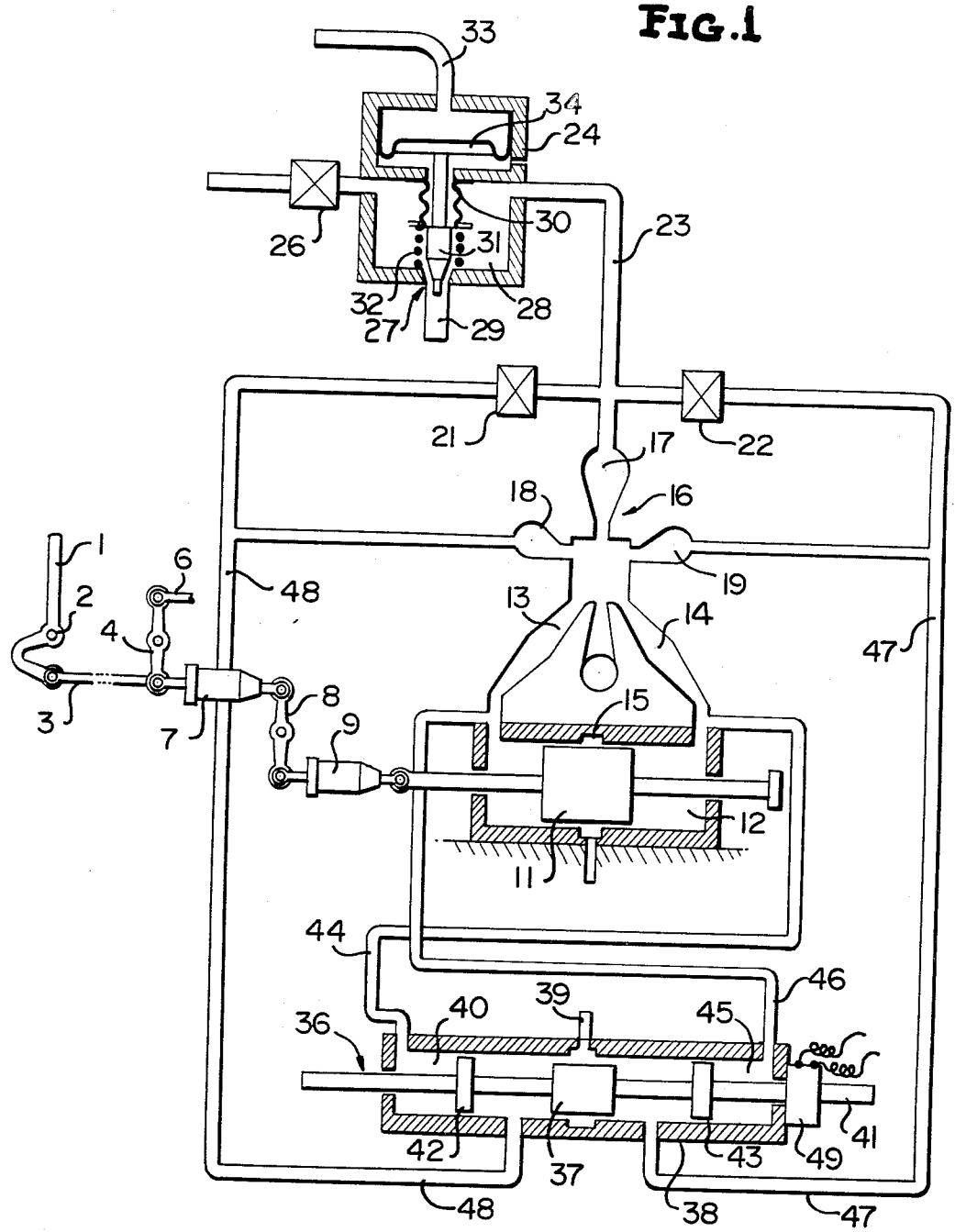

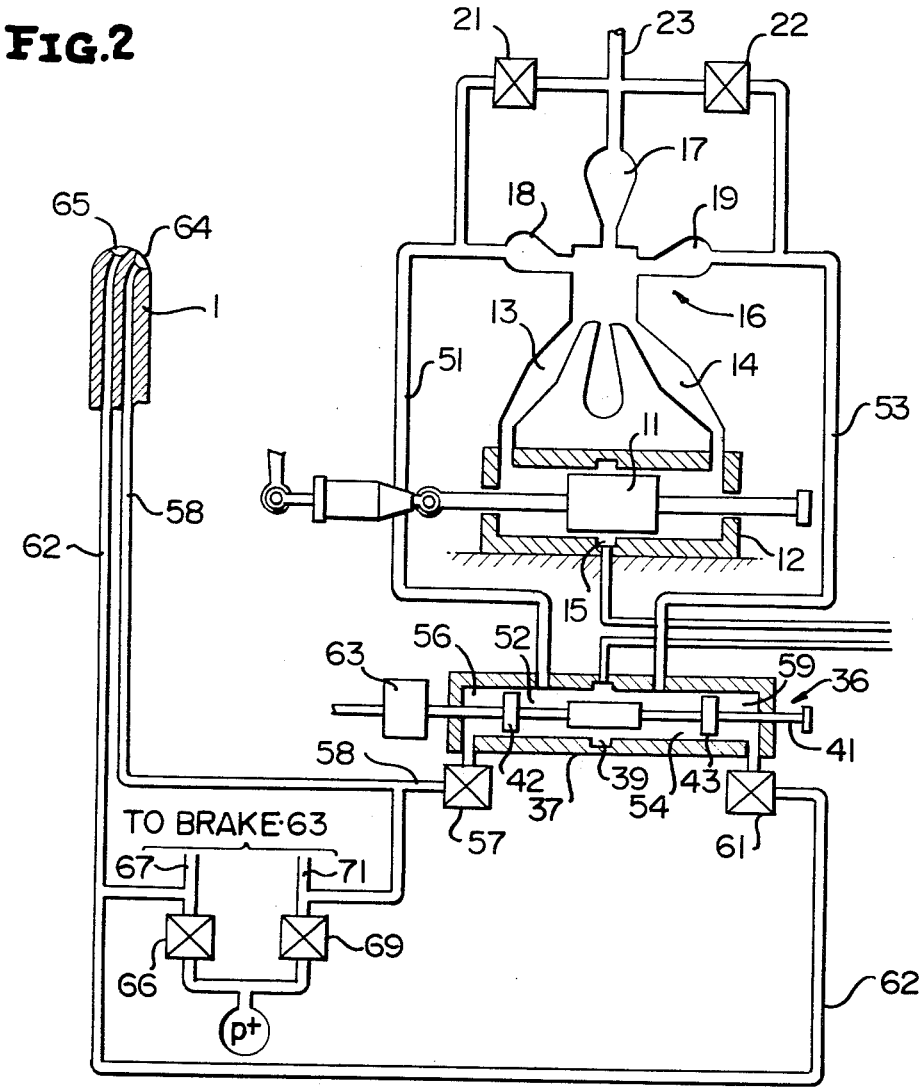
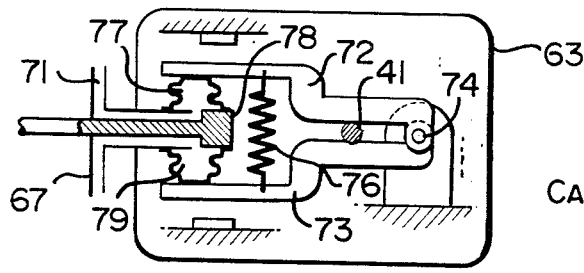

3,405,892
PNEUMATIC FEEL TRIM CONTROL
Carmine V. Di Camillo, Silver Spring, Md., assignor to Bowles Engineering Corporation, Silver Spring, Md., a corporation of Maryland
Filed June 2, 1966, Ser. No. 554,847
11 Claims. (Cl. 244—83)

ABSTRACT OF THE DISCLOSURE

A feel-trim control system in which a control force applied to a control member is transmitted to a piston located in a cylinder, there being a differential pressure applied to the cylinder on opposite sides of the piston from the output passages of the pure fluid amplifier. A center dump in the cylinder bleeds fluid from either side of the piston as a function of the position of the piston in the cylinder which in turn is controlled by the force applied to the control member. The pressure across the piston varies as the flow varies so that a force is developed across the piston which opposes movement thereof whereby to impart a counteracting force to the control member as a function of displacement of the member from its median position. A trim control apparatus is selectively employed to provide a control signal as a function of a displacement of the piston from its median position, the control signal being applied to the control passages of the fluid amplifier to vary the differential pressure across the amplifier output passages so that a zero net force may be developed across the piston in any position to which the piston is actuated by means of the control member.

The present invention relates to feel and trim control systems for steering craft and, more particularly, to a feel-trim control system for steering craft, which system utilizes pure fluid, i.e. fluidic, devices for control of the feel and trim mechanisms in order to greatly simplify the apparatus normally associated with such mechanisms.

Conventional feel-trim control systems for steerable craft, particularly aircraft, are extremely complex devices employing bellows, springs, bell cranks, electrical feel and trim actuators, jack screws, reversing motors, brakes, viscous dampers, torque tubes, force link mechanisms, switches, relays, etc. Needless to say, the devices are quite complex and large, and occupy much needed space in today's aircraft.

It is an object of the present invention to provide a feel-trim mechanism for aircraft which is quite small, and in fact, so small that in one embodiment, it may be located in the cabin of the craft immediately adjacent the stick, assuming aircraft control.

In practice, the force of the stick is transmitted through a conventional power boost means to control a surface of the aircraft and is further transmitted through override spring cartridges to a piston located in a cylinder. The cylinder is fed on opposite sides of the piston from the output passages of a pure fluid amplifier. The position of the piston controls bleeds to a center dump in the piston cylinder so that, as the piston is moved, as a result of movement of the control stick, the pressure on opposite sides of the piston is varied. This differential in pressure develops a force across the piston which opposes movement thereof and imparts 'feel" to the stick. The force developed on the stick is a function of displacement of the stick from its median position.

The trim control apparatus of the invention is employed to generate a control signal which is a function of the displacement of the piston from its median position. This signal is applied to the control passages of the aforesaid fluid amplifier to deflect the power stream of the amplifier to a position such that a zero net force is developed across the piston at the particular position thereof at which the trim system is actuated under control of the pilot.

The piston and fluid amplifier system described relative to the feel system operate with hydraulic fluid at a pressure which varies with air speed. The apparatus employs an air-to-hydraulic pressure interface which senses ram air pressure and adjusts hydraulic pressure as a function of air speed. In consequence, stick displacement and feel in the system are made to be functions of the actual air speed of the craft, this feature being an essential of any such system.

From the above, it is apparent that the total system required when pure fluid devices are employed in a feel-trim system are quite small, consisting basically of one or perhaps two fluid amplifiers and a piston and a feel-trim control device, which consists of one further piston and a brake operating thereon.

It is an object of the present invention to provide a feel-trim control system for steerable vehicles which system is small, lightweight, and highly versatile and which can perform all the functions performed by the far more complex, expensive and space-consuming devices of the prior art.

It is another object of the present invention to employ a two fluid feel and trim control system for aircraft wherein the pneumatic portion of the controls may be arranged in the cockpit and perform small force actuations while hydraulic fluid is employed for large force actuations externally of the cockpit.

The above and still further objects, features and advantages of the present invention will become apparent upon consideration of the following detailed description of one specific embodiment thereof, especially when taken in conjunction with the accompanying drawings, wherein:

FIGURE 1 is a schematic diagram of a first embodiment of the present invention;

FIGURE 2 is a schematic diagram of the second embodiment of the present invention; and FIGURE 3 is a schematic diagram of the brake employed in the embodiment of FIGURE 2.

Referring now specifically to FIGURE 1 of the accompanying drawings, there is diagrammatically illustrated a control stick 1 for controlling some surface of an aircraft or other steerable craft which stick is pivoted about a pivot point 2 so as to produce reciprocating movement of a rod 3. The rod 3 is connected to a bell crank 4 which drives a further control rod 6 employed to produce actual operation of a control surface. In most steerable vehicles, the rod 6 provides an input movement to a power booster and thus the control stick is effectively isolated from the control surfaces so that feel is lost in the system. In order to provide feel in the system the rod 3 is also connected through an override spring cartridge 7, a bell crank 8 and a second override spring cartridge 9 to a piston 11.

The piston 11 is positioned in a cylinder 12 having a center dump 15. The center dump 15 is normally a return to the low pressure side of a pump, in this case a pump providing hydraulic fluid under pressure to the system. The piston 11 is a balanced area piston and the fit between the circumferential surface of the piston 11 and the walls of the cylinder 12 is such as to provide a leakage path between the areas on the two sides of the piston and the dump passage 15. Thus, if equal fluid flow is directed to the two sides of the piston, and the piston is centered, the pressures on the two sides of the piston are equal and the piston is balanced. However, if the piston 11 is moved from its center position due to movement of the stick 1, the resistance to flow from the two ends of the piston to the bleed path 15 is different and different pressures are developed in the volumes at the two ends of the pistons.

Relating the above operation to the movement of the stick 1, if the stick is moved from a position in which the piston 11 is centered, the piston 11 is moved with the stick from its center position. A force is developed across the piston tending to oppose the movement imparted thereto by the stick. The magnitude of the force is a function of the displacement of the stick and thus the force is directly related to the control function imparted to the craft. The override spring cartridges transmit the force developed on the piston to the stick and movement of the stick to the piston but permit the pilot, if a malfunction develops in the feel-trim control, to maintain control of the system, i.e. link 6, by overriding the force of the spring cartridges.

Pressurized fluid is supplied to the two ends of the chamber 12 via output passages 13 and 14 of a pure fluid amplifier generally designated by the reference numeral 16. The amplifier is a proportional type and consists of a power nozzle 17 and opposed control nozzles 18 and 19. The amplifier 16 is of the general type disclosed in U.S. Patent No. 3,122,165. The control nozzles 18 and 19 are connected through flow resistors 21 and 22, respectively, to a passage 23 having pressurized fluid applied thereto. The passage 23 is also connected to the power nozzle 17 of the amplifier 16. Normally, the flow restrictors 21 and 22 introduce equal pressure drops into the system so that the pressures applied to the control nozzles 18 and 19 are equal and the stream of fluid issued from the power nozzle 17 divides equally between output passages 13 and 14. Thus, when the piston 11 is centered, the pressure on opposite sides of the piston 11 are equal.

The passage or pipe 23 receives pressurized hydraulic fluid from an air-to-hydraulic pressure interface 24. Hydraulic pressure is supplied to the apparatus from a pump through a fixed restrictor 26 so that a division in pressure may take place between the restrictor 26 and a variable restrictor 27. More particularly, fluid which passes through the restrictor 26 is introduced into a chamber 28 which supplies the passage 23 and also supplies a dump return passage 29 through the variable restrictor 27. The flow to the passage 29 is controlled by means of a piston 31 which is biased by a spring 32 in an upward position. The ram air pressure of the craft, which is a function of air speed, is applied to the interface 24 through a passage 33 to the upper side, as illustrated in FIGURE 1, of a diaphragm 34. The diaphragm is isolated from hydraulic fluid by means of bellows 30. The diaphragm 34 is connected to the piston 31, and thus the pressure developed above the diaphragm 34 tends to move the piston 31 downwardly against the force of the spring 32. If the air speed of the craft is decreased, the force developed on the diaphragm 34 decreases, the opening in the variable restrictor 27 increases and the pressure developed in the pipe 23 decreases. Thus, the pressure of the fluid supplied to the fluid amplifier 16 is a variable function of the air or water speed, as the case may be, of the vehicle on which the apparatus is mounted. It is apparent that, by contouring the surface of the piston 32 relative to the adjacent surfaces of the interface 24 leading into the passage 29, various desired functions of pressure in the pipe 23 to air or water speed may be obtained.

It is apparent that, as the air speed of a craft increases, the force that must be exerted on the stick 1 for a given movement of the stick increases. In the present system, the pressure in the passage 23, and thus the pressure and flow rate of the fluid supplied to the outlet passages 13 and 14 of the amplifier 16 increases with speed. In consequence, the force available to oppose movement of the piston 11 increases with air speed as required in such a system.

The trim adjustment of the apparatus of the present invention may take several forms, a first form being illustrated in FIGURE 1 of the accompanying drawings. The trim control device comprises a trim control valve 36 having a piston 37 positioned within a cylinder 38. The cylinder 38 is provided with a center dump annulus 39 and the piston 37 is spaced relative to the internal walls of the chamber 38 to provide a variable bleed to the dump 39. The piston 37 is carried on a shaft 41 having disks 42 and 43 disposed on opposite sides of the piston 37. The piston 37, in this configuration, is employed only for purposes of producing a variable bleed whereas the disks 42 and 43 serve the function of driving the mechanism. The region 40 of the chamber 38 to the left disk 42 is connected via a passage 44 to the output passage 14 to the fluid amplifier. The region 45 of the chamber 38 to the right of the disk 43 is connected via a passage 46 to the output passage 13 of the fluid amplifier 16. Further, the region between the piston 37 an the disk 43 is connected via a passage 47 to the control nozzle 19. Similarly, the region between the piston 37 and the disk 42 is connected via a feedback passage 48 to the control nozzle 18.

The rod 41 is retained in place by an electric brake 49 which can be released by the pilot so as to permit the rod 41 to move freely. The brake 49 is released only when the pilot wishes to readjust the trim position. For instance, if the pilot has moved the stick 1 from its neutral position and thus created an unequal pressure across the piston 11, the unequal pressure is transmitted to the regions 40 and 45 of the valve 36. The shaft structure 41 cannot move due to action of the brake 49 and thus a force is maintained on the stick 1 indicative of the fact that the stick is off the trim position by a predetermined amount. If it is wished to readjust the trim position, the brake 49 is actuated and the rod or shaft 41 is free to move. Under these conditions, the differential in pressures between the passages 44 and 46 causes the shaft 41 to translate. Translation of the shaft 41 moves the piston 37 so that the impedances between the chambers immediately adjacent the two sides of the piston 37 and the sump 39 are different. Due to these differences in impedances, a differential in pressure is developed between the control nozzles 18 and 19 which displaces the power stream issued by the power nozzle 17 of the amplifier 16. The displacement of the power stream is such that the pressures across the piston 11 are now balanced. More particularly, since under the conditions being described, the piston 11 is off center from the chamber 12, the impedances from the two sides of the chamber to the dump passage 15 are different.

As an example, let it be assumed that the piston 11 is to the left of center and the brake 49 is in the released condition. Under these conditions, the pressure to the control nozzle 18 is higher than the pressure to the control nozzle 19 and more of the power stream is directed to the output passage 14 than to the output passage 13. Thus, the flow through the restriction between the right side of the piston and the dump 15 is now increased while the flow through the restriction between the left side of the chamber and the center dump 15 is decreased. In consequence, the pressure on the left side of the piston is decreased and the pressure on the right side of the piston is increased. In a properly adjusted system, a balance between the position of the shaft 41 and the pressure differentials operating in the system are achieved at the position of the piston 11 wherein substantially no force is exerted on the stick 1.

Actually, in this system there is a small residual force on the stick. In order to unbalance the power stream flow of the amplifier 16 the pressures in the chambers immediately to the right and left of the piston 37 must be unbalanced resulting in a force on the piston 37. This force must be countered by a force resulting from a pressure difference across the passages 44 and 46. However, due to gain of the amplifier, only small pressure differences are required across the control nozzles 18 and 19 to produce the requisite stream deflection. Further, a force is developed on the shaft 41 only to the extent that the surface areas of the disks 42 and 43 are greater than the areas of the end surfaces of the piston 37. Since the pressure differences are small and the effective area on which the pressure difference operates is quite small, the residual force on the stick is practically unnoticeable.

As indicated immediately above, in the apparatus of FIGURE 1, there is a possibility of a small residual force on the stick except when the stick is in its neutral position in which case the piston 11 is centered. In FIGURE 2 of the accompanying drawings, there is illustrated a system in which there is no residual force on the stick even though the piston 11 is not in its center position. In addition, the system of FIGURE 2 provides a pure fluid system in that a fluid rather than an electrical brake is employed.

Referring specifically to FIGURE 2 of the accompanying drawings, the basic amplifier 16 and the air-to-hydraulic pressure interface 24 are identical with the corresponding devices of FIGURE 1. Thus, the feel portion of the system is the same as in FIGURE 1, but the trim control portion is different. The trim control valve 36 is the same as in FIGURE 1, but its connection to the amplifier is different. Specifically, the control nozzle 18 is connected via a passage 51 to a region 52 of the valve 36 subsisting between the piston 37 and the disk 42. Correspondingly, the control nozzle 19 is connected via passage 53 to a region 54 of the valve 36 subsisting between the piston 37 and the disk 43. The region 56 of the valve 36, to the left of the disk 42, is connected via a restrictor to a passage 58 while the region 59 to the right of the disk 43 as illustrated in FIGURE 2 is connected via a fluid restrictor to a passage 62. The portion of the valve 36 between disks 42 and 43 operates with hydraulic fluid as in FIGURE 1, but the regions 56 and 59 operate with pressurized air and, under these circumstances, can communicate directly with the passenger compartment.

The brake 63 on the shaft 41 is a fluid brake; the details of one form of which being illustrated in FIGURE 3 of the accompanying drawings. Returning to the description of the apparatus of FIGURE 2, the passage 58 is connected to an opening 64 formed in the upper face of the stick 1. The passage 62 is connected to another opening 65 in the face of the stick 1. Fluid under pressure is coupled to the passage 58 from a pressurized source via a restrictor 69 and a further passage 71. Correspondingly, fluid under pressure is supplied to the passage 62 via a restrictor 66 in a passage 67. The passages 67 and 71 are coupled, as will be illustrated in FIGURE 3, to two chambers of a fluid brake. The receipt of pressurized fluid in either chamber produces release of the brake.

The open ports 64 and 65 prevent the development of a high pressure in either of the passages 58 and 62. However, upon closure of either of these ports, a high pressure is developed in the corresponding passage which releases the brake 63 and permits movement of the shaft 41.

As an example of operation of the apparatus of FIGURE 2, assume that the stick 1 is moved to the right so that the piston 11 is moved to the right. Now, if it is wished to change the trim position of the stick 1 so that it coincides with the present position of the stick, the port 64 is closed. Upon closure of the port 64, the pressure in the passages 58 and 71 rises, releasing the brake and increasing the pressure in the region 56 of the valve 36. The shaft 41 moves at a uniform rate to the right so long as port 64 is blocked. In consequence, the pressure in the region 52 of the valve 36 decreases while the pressure in the region 54 increases both at a uniform rate. The changing differential in pressure across the piston 37 is applied across the control nozzles 18 and 19 and a uniformly increasing portion of the fluid stream is diverted to the outlet passage 13 and a decreasing portion is delivered to the outlet passage 14. Thus, the pressure to the left of the piston 11 rises and the pressure to the right decreases. Initially, the piston was deflected to the right, as viewed in FIGURE 2 so that the pressure to the right was greater than the pressure on the left. With the change of proportioning of the power stream, the flow to the left of the piston now increases and the flow to the right decreases and at some point in time the pressure becomes balanced at a new position of the stream. When a null in force is felt on the stick 1, the pilot uncovers the passage 64, the brake 63 is applied and the system remains in the position dictated by the pilot, which position he has determined is the no-force position on the stick. Thus, a complete balancing of forces is possible with the apparatus of FIGURE 2. It should be pointed out that, if the passage 65 is blocked, then the brake is again released but under these conditions the shaft 41 is moved to the left and an increase in flow through the outlet passage 14 of the amplifier 16 is effected. Thus, this condition trim is for a condition when the piston 11 has moved to the left of the center position.

Referring now specifically to FIGURE 3 of the accompanying drawings, there is illustrated a brake mechanism which may be employed with a pure fluid system. The brake comprises two members 72 and 73 which are mirror images of one another and form two jaws of the brake. The jaws 72 and 73 are pivoted about an axis or pivot pin 74 supported on the main structure of the apparatus. The jaws may be moved independently of one another under control of fluid pressures supplied to the system.

The shaft 41 of the valve 36 of FIGURES 1 and 2 is clamped between the two members of the jaw which are held together by a tension spring 76.

A first bellows 77 is disposed between a portion of the jaw 72 and a frame member 78. A second bellows 79 is disposed between the frame member 78 and the second jaw 73 of the brake. The bellows 77 is connected to the passage 71 of FIGURE 2 and the bellows 79 is connected to the passage 67 of FIGURE 2.

When fluid under pressure is supplied to the passage 67, the bellows 79 is expanded forcing the jaw 73 to rotate in a counterclockwise direction about the pivot pin 74. The shaft 41 is now released, and may translate as a result of pressure developed in the chamber 59. Similarly, if pressure is developed in the passage 71, the bellows 77 is expanded causing the jaw 72 to rotate clockwise around the pivot 74, again releasing the shaft 41. Thus, in this system, the apparatus is wholly fluidic and this is rendered possible by employing two different fluids in the valve 36.

In the apparatus as illustrated in FIGURE 1, an electrical brake was employed since hydraulic fluid was used throughout the valve mechanism. It is apparent that the brake of FIGURE 3 may be employed in the apparatus of FIGURE 1 with no interconnection between the brake control and the passages and chambers of the valve 36 or the other hydraulic fluid elements.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A control system comprising a closed, hollow member having a longitudinal axis and at least one longitudinally extending wall, a piston positioned in said hollow member for movement parallel to said longitudinal axis, said piston having end surfaces generally transverse to said axis, a first passage formed in said longitudinally extending wall of said hollow member adjacent the surface of said piston, said piston being spaced from said longitudinally extending wall a distance to define high impedance flow passages between said wall and said piston from said end surfaces of said piston to said first passage, means for supplying fluid under pressure to said hollow member to exert fluid pressure on both end surfaces of said piston whereby equal forces are developed on both end surfaces of said piston, means for moving said piston longitudinally of said hollow member, means for detecting an unbalance of forces on said piston, and at-will operable means responsive to said means for detecting for varying the pressures applied to said hollow member to rebalance the forces on said piston.

2. The combination according to claim 1 wherein said means for detecting comprises means for sensing the differential in pressure across said piston.

3. A control system comprising a closed, hollow member having a longitudinal axis and at least one longitudinally extending wall, a piston positioned in said hollow member for movement parallel to said longitudinal axis, said piston having end surfaces generally transverse to said axis, a first passage formed in said longitudinally extending wall of said hollow member adjacent the surface of said piston, said piston being spaced from said longitudinally extending wall a distance to define high impedance flow passages between said wall and said piston from said end surfaces of said piston to said first passage, means for supplying fluid under pressure to said hollow member to exert fluid pressure on both end surfaces of said piston whereby equal forces are developed on both end surfaces of said piston, and means for moving said piston longitudinally of said hollow member,
wherein said means for supplying fluid comprises a fluidic amplifier having a power nozzle, opposed control nozzles and at least two output passages, pressure means for applying fluid under pressure to said power nozzle, said output passages being connected to opposite ends of said hollow member and constituting said means for supplying, and means for biasing said control nozzles to balance the forces on said piston.

4. The combination according to claim 3 wherein said control system is a feel control system for moving craft and wherein said pressure means includes means for varying the pressure of fluid supplied to said power nozzle and said control nozzles as a function of speed of said craft relative to said medium.

5. The combination according to claim 3 further comprising means for detecting the differential in pressure across said piston and at-will operable means responsive to said means for detecting for varying the bias applied to said control nozzles to balance the pressure acting on said piston.

6. The combination according to claim 5 wherein said means for detecting comprises a chamber means, a piston means positioned for movement in said chamber means, said output passages of said fluidic amplifier being connected to said chamber means adjacent opposite ends of said piston means, means for normally preventing movement of said piston means, and said at-will operable means including means for at-will releasing said piston means and means responsive to movement of said piston means for varying the bias pressure applied to said control nozzles.

7. The combination according to claim 3 further comprising at-will operable means for varying the bias pressure applied to said control nozzles to balance the forces acting on said piston.

8. The combination according to claim 7 wherein said at-will operable means comprises a chamber means, a piston means slidable in said chamber means, means for at-will translating said piston means and means responsive to movement of said piston means for varying the bias pressures supplied to said control nozzles.

9. A control system comprising:
a member having a chamber defined therein, said chamber having a longitudinal axis and at least one longitudinally extending wall,
a piston positioned in said chamber and unrestrained to be movable parallel to said longitudinal axis,
translating means responsive to a force applied thereto for translating said piston in said chamber parallel to said longitudinal axis,
actuable means for selectively applying a force to said translating means,
a source of differential fluid pressure,
means connecting said differential fluid pressure across opposite longitudinal ends of said piston for maintaining said piston in a predetermined position in said chamber in the absence of a force applied from said actuable means to said translating means, and
means responsive to application of a force from said actuable means to said translating means for varying said differential fluid pressure to apply a counteracting force to said translating means.

10. The combination according to claim 9 further comprising:
at-will operable means responsive to translation of said piston from one position to another position for varying said differential pressure sufficiently to maintain said piston in said another position.

11. The combination according to claim 10 wherein said translating means includes a control stick for steering a fluid medium craft, said system further comprising:
means for proportionally varying said differential fluid pressure as a function of the speed of said craft in said fluid medium.

References Cited

UNITED STATES PATENTS

| | | | |
|---|---|---|---|
| 2,447,920 | 8/1948 | Terry | 138—43 |
| 3,124,999 | 3/1964 | Woodward | 137—81.5 XR |
| 3,223,122 | 12/1965 | Banker | 137—625.4 |

ANDREW H. FARRELL, *Primary Examiner.*